United States Patent

Inoue et al.

[11] Patent Number: 5,879,807
[45] Date of Patent: Mar. 9, 1999

[54] GRAPHITE SHEET OR BLOCK MATERIAL

[75] Inventors: Takao Inoue, Hirakata; Naomi Nishiki, Kyoto; Junji Ikeda, Ikoma, all of Japan

[73] Assignee: Matsushita Electric Industrial Co.,Ltd., Osaka, Japan

[21] Appl. No.: 592,673

[22] Filed: Jan. 26, 1996

[30] Foreign Application Priority Data

Jan. 26, 1995 [JP] Japan .................................. 7-010586

[51] Int. Cl.$^6$ ........................................................ B32B 9/00
[52] U.S. Cl. ........................ 428/408; 428/260; 428/367; 428/368; 428/389; 428/402; 429/218; 429/232; 427/122; 423/421; 204/292; 204/294
[58] Field of Search ................................... 428/260, 288, 428/289, 367, 368, 408, 922, 389, 402; 429/218, 232, 233; 427/122, 249; 423/448, 421; 29/623.1, 623.5; 204/294, 292

[56] References Cited

U.S. PATENT DOCUMENTS

| | | | |
|---|---|---|---|
| 4,980,250 | 12/1990 | Takahashi et al. | 429/194 |
| 5,069,683 | 12/1991 | Fong et al. | 29/623.1 |
| 5,153,082 | 10/1992 | Ogino et al. | 429/194 |
| 5,244,757 | 9/1993 | Takami et al. | 429/194 |
| 5,449,507 | 9/1995 | Murakami et al. | 423/448 |

FOREIGN PATENT DOCUMENTS

| | | |
|---|---|---|
| 4-79155 | 3/1992 | Japan . |
| 4079 155 | 12/1992 | Japan . |

*Primary Examiner*—William Krynski
*Assistant Examiner*—Abraham Bahta
*Attorney, Agent, or Firm*—Wenderoth, Lind & Ponack, L.L.P.

[57] ABSTRACT graphite sheet or block anode material can be used for non-aqueous lithium secondary battery, which has the improved characteristics of battery charge-discharge, as well as a circuit substrate and a shield plate in which dopants should be intercalated. The graphite sheet or block can be made of graphitized polymer film or films and comprises: a) an electric conductive body having a surface, in which graphite crystals are oriented along the surface of the graphite sheet or block and b) interphase insertion potions uniformly distributed over the surface of the graphite sheet or block, in which graphite phases are built perpendicularly to the surface to permit dopant to be inserted into a gap between graphite phases.

18 Claims, 2 Drawing Sheets

GRAPHITE SHEET OR BLOCK MATERIAL

BACKGROUND OF THE INVENTION

1. Field of the Invention

The present invention relates to a graphite sheet or block material suitable to a dopant interphase intercalation, which is used for a secondary battery, a circuit substrate, a shield material and so on, especially a graphite sheet or block used for the secondary battery wherein an active material can be intercalated between graphite phases or layers.

2. Prior Art

Many kinds of graphite have been proposed for an anode material of a lithium secondary battery as shown in U.S. Pat. No. 4,980,250 (inventors: Takahashi et al.), No.5,069,683 (inventors:Fong et al.), No. 5,153,082 (inventors: Ogino et al.), No. 5,244,757 (inventors: Takami et al.). In all cases, however, the anode material is made of carbon or graphite powder and/or fibers and binders, so that the electric conductivity is not good in comparison with the carbon or graphite material itself.

On the other hand, as reported by Japanese Patent Kokai 4-79155, a graphite sheet or block can be prepared directly from a specific polymer film by graphitizing at a high temperature. The graphite sheet has a good electric conductivity since graphite crystalline orientation is arranged along the sheet surface. However, the graphite sheet has a disadvantage that it is difficult for an active material or dopant to be intercalated from the sheet surface into the graphite interphase because of such a graphite crystalline orientation, so that the graphite material can not show the good characteristics of battery charge-discharge if used in the anode of the lithium secondary battery.

SUMMARY OF THE INVENTION

Therefore, a first object of the present invention is to provide a graphite sheet or block material suitable to a dopant interphase intercalation useful for electrodes of the secondary battery, the circuit substrate and the shield plate which can be prepared from a specific polymer film without graphite powders and binders.

A second object of the present invention is to provide a graphite sheet or block material into which more active material can be intercalated than the conventional graphite material to improve the characteristics of battery charge-discharge.

According to the present invention, there is provided a graphite sheet or block material suitable to a dopant interphase intercalation, which comprises:

a) an electric conductive body having a surface, in which graphite crystals are oriented along the surface of the graphite sheet or block and b) interphase insertion portions uniformly distributed over the surface of the graphite sheet or block, in which graphite phases are built up perpendicularly to the surface to permit dopants to be intercalated, i.e., inserted, laterally into a gap between graphite phases.

In the present invention, said electric conductive body is a graphitized sheet made by baking polymer film, preferably having a thickness of 5 to 200 μm. In case of more than 200 μm in thickness, gases generated inside the film during the heat treatment may cause the resultant graphite film to be collapsed, which can not be used for the electrode material.

If said conductive body is in a form of block, plural films should be stacked to a desired thickness and baked.

The polymer film or stacked films may be baked at a temperature of more than 2000° C., preferably at about 3000° C. in an inert gas atmosphere under a pressure of 0.1 to 50 kg/cm², which may be selected depending on the film thickness.

The polymer film may be selected from the group consisting of polyoxadiazole (POD), polybenzothiazole (PBT), polybenzo-bis-oxazole (PBBT), polyoxazole (PBO), polybenzo-bis-oxazole (PBBO), polyimide (PI), polyamide (PA), polyphenylene-benzoimidazole (PBI), polyphenylene-benzo-bisimidazole (PPBI), polythiazole (PT) and polyparaphenylene-vinylene (PPV), preferably polyparaphenylene-1,3,4-oxadiazole, aromatic polyimide represented by the following formula (1) and aromatic polyamide represented by the following formula (2).

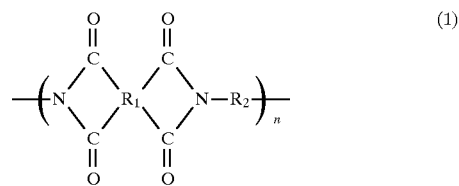

Wherein R₁=

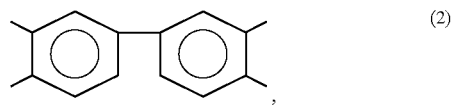

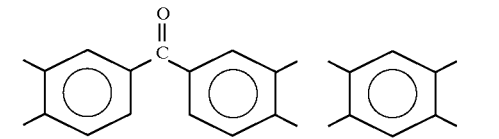

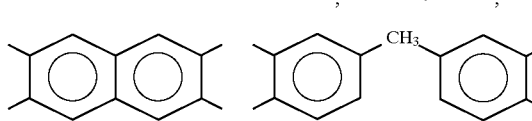

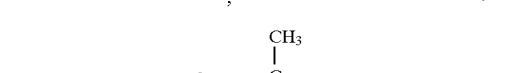

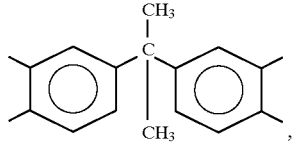

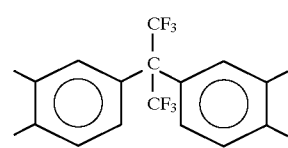

R₂ =

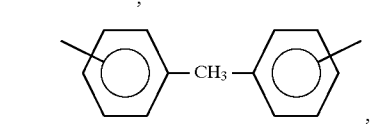

-continued

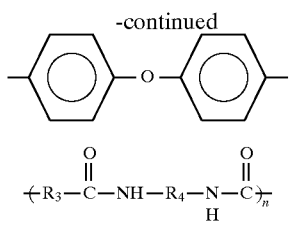

Wherein

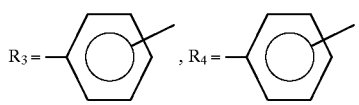

The polymer film may contain organic or inorganic fillers because the fillers cause the film to be foamed uniformly. The content may be 0.5 to 20%, preferably 1 to 10% based on the weight of the film. Especially, said filler may be selected from the group consisting of titanium oxide and calcium hydrogenphosphate and preferably is used with a phosphate.

The interphase insertion portion may be in a form selected from the group consisting of through hole, groove, recess and projection formed on the surface of said electric conductive body. The diameter of said through hole or recess, the width of the groove and the radial distance between the adjacent projections may be within 0.2 to 100 $\mu$m, preferably 0.2 to 50 $\mu$m.

The through holes, grooves or recesses of the electric conductive body are formed by forming them on the polymer sheet or sheets by means of laser irradiation and baking the polymer sheet or sheets. On the other hand, said projections of the electric conductive body are formed by positioning catalyst material points on which graphite crystals grow up over the surface of the polymer film and baking the same at a temperature of more than 2000° C.

In case of secondary battery, the dopants to be intercalated may be selected from the following donor group consisting of Li, K, Rb, Cs, Sr, Ba, $Br_2$, $Cl_2$, metal chloride such as $FeCl_2$, $AlCl_3$, $NiCl_5$ and $SbCl_4$, $H_2SO_4$, $CrO_3$ and metal fluoride such as $SbF_4$ and $AsF_3$, depending on usage of the material.

BRIEF DESCRIPTION OF THE DRAWINGS

These and other object and advantages of the present invention will become more apparent and more readily appreciated from the following detailed description of the presently preferred exemplary embodiments of the invention taken in conjunction with the accompanying drawings.

Of the drawings.

DESCRIPTION OF THE PREFERRED EMBODIMENTS

Figure 1:
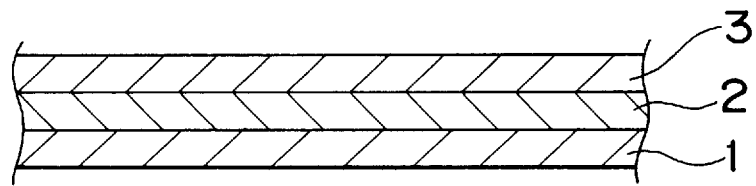
FIG. 1 is a sectional view showing a structure of the anode material made of copper film and mixture of graphite powders and binders.

The following non-limiting examples illustrate certain aspect of the invention.

EXAMPLES 1 AND 2

A film of polyparaphenylene-1, 3, 4-oxadiazole 15 having 25 $\mu$m in thickness was prepared and many grooves 16 having 1 $\mu$m in width were made on the film at intervals of 2 $\mu$m by means of laser irradiation from EXMA laser beam machine. On the other hand, many recesses having 1 $\mu$m in diameter were made on another film in the same way as above.

The film was heated at a speed of 10° C./min to 1000° C. under nitrogen gas atmosphere in an electric furnace of LTF-8 type made by SANKYO DENRO Ltd. in Japan and then subjected to preliminary heat treatment for one hour with maintaining 1000° C.

The resultant graphitized film (A1; grooves, A2; recesses) was set in a cylindrical vessel of graphite so as to be able to expand and contract therein and was heated at a speed of 20° C./min under a pressurized atmosphere having argon gas of 0.2 kg/cm$^2$ in an ultra high temperature furnace of 46-5 type made by SHINSEI DENRO Ltd. in Japan to a predetermined maximum temperature; 2000° C., 2500° C. and 3000° C. to give three kinds of graphite films (hereinafter each referred to as A1-2000, A1-2500, A1-3000, A2-2000, A2-2500, A2-3000). To make a comparative study, another graphite film (C1) without any recesses or grooves was made in the same way as above.

All graphite films (A1-2000, A1-2500, A1-3000, A2-2000, A2-2500, A2-3000 and C1) thus made were flexible. However, it was observed that the former graphite films (A1-2000, A1-2500, A1-3000, A2-2000, A2-2500, A2-3000) have first graphite crystals 21 which are oriented along the surface of the graphite film 20 and second graphite crystals 22 constituting a graphite body 23, which are built up in a crossing direction to the surface of the graphite film, so that the second graphite crystals 22 have interphases grown up wherein lithium ions can be inserted or received.

The resultant graphite films are set in a vessel made of pyrex glass to contact directly metal lithium and metal sodium, the vessel was sealed under a vacuum pressure and heated at 150° C. to insert intercalents into the graphite film. It was observed that the graphite body 23 in the crossing direction to the surface of the graphite film as well as the first graphite crystals 21, has second stage interphase compounds.

On the other hand, the comparative graphite films have no second graphite crystalline 22, so that it was observed that no second stage interphase compound exists in the cross direction to the surface of the graphite film.

Figure 2:
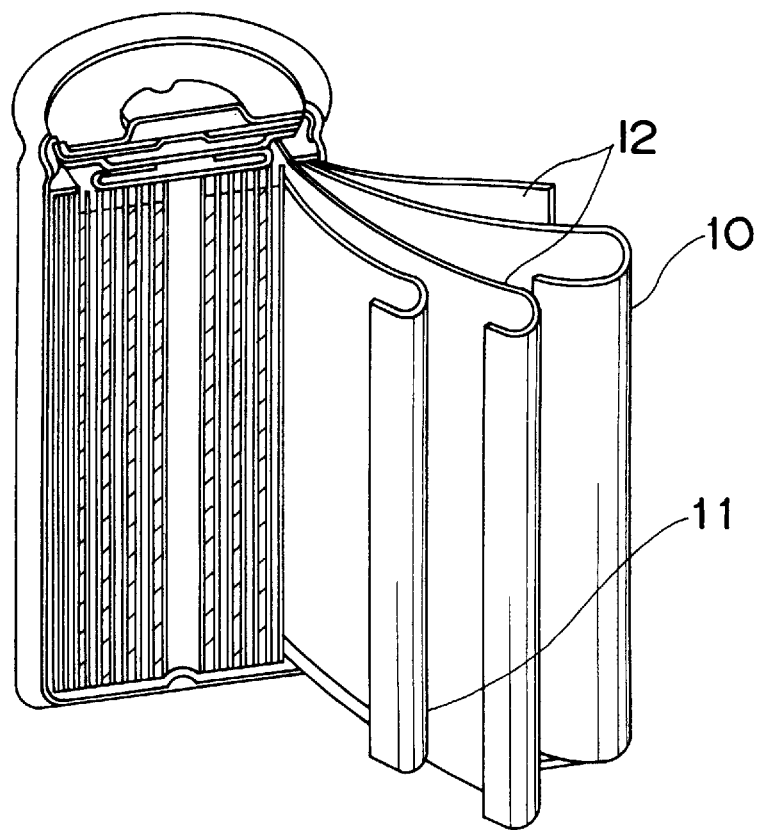
FIG. 2 is a vertical sectional view of lithium secondary battery made of the graphite sheet material according to the present invention.
Figure 3:
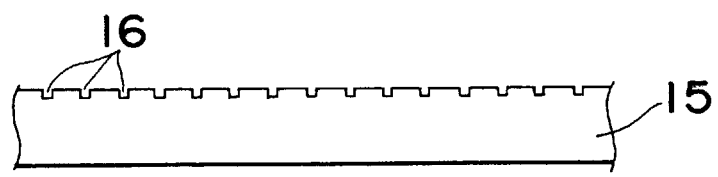
FIG. 3 is a sectional view of the polymer film before heat-treatment.
Figure 4:
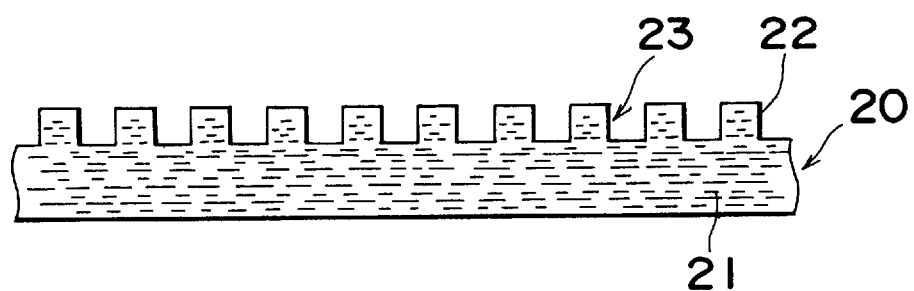
FIG. 4 is a sectional view of the graphite film after heat-treatment.

The lithium intercalated graphite film according to the present invention and the comparative graphite sheet as an anode material 10 were respectively pressed together with a separator 12 of polypropylene having a microporous construction and a cathode material 11 of a flexible graphite sheet having no intercalents between the interphase in an atmosphere of inert gas to prepare a lithium secondary cell shown in FIG. 2, wherein a mixture of propylenecarbonate and 1, 2-dimethoxyethane containing lithium perchlorate was used as electrolyte.

EXAMPLE 3

A film of polyparaphenylene-1, 3, 4-oxadiazole 15 having 25 $\mu$m in thickness was prepared and Ni powders as catalyst were uniformly sprayed on the film surface.

The film was heated at a speed of 10° C./min to 1000° C. under nitrogen gas atmosphere in an electric furnace of LTF-8 type made by SANKYO DENRO Ltd. in Japan and then subjected to preliminary heat treatment for one hour with maintaining 1000° C.

The resultant graphitized film (A3) was set in a cylindrical vessel of graphite so as to be able to expand and contract therein and was heated at a speed of 20° C./min under a pressurized atmosphere having argon gas of 0.2 kg/cm² in an ultra high temperature furnace of 46-5 type made by SHIN-SEI DENRO Ltd. in Japan to a predetermined maximum temperature; 2000° C., 2500° C. and 3000° C. to give three kinds of graphite films (A3-2000, A3-2500, A3-3000). To make a comparative study, another graphite film (C2) without any Ni powders was made in the same way as above.

All graphite films thus made were flexible. However, it was observed that the former graphite films (A3-2000, 2500, 3000) have first graphite crystals 21 which are oriented along the surface of the graphite film 20 and second graphite crystals 22 constituting a graphite body 23, which are built up from the catalyst positions on the graphite film in the crossing direction to the surface of the graphite film, so that the second graphite crystals 22 have interphases grown upwardly against the surface wherein lithium ions can be inserted or received.

The resultant graphite films are set in a vessel made of pyrex glass to contact directly to metal lithium and metal sodium, the vessel was sealed under a vacuum pressure and heated at 150° C. to insert intercalents into the graphite film. It was observed that the graphite body 23 in the crossing direction to the surface of the graphite film as well as the first graphite crystals 21, has second stage interphase compounds.

On the other hand, the comparative graphite films (C2) have no second graphite crystals 22, so that it was observed that no second stage interphase compound exists in the cross direction to the surface of the graphite film.

The lithium intercalated graphite films (A3-2000, 2500, 3000) according to the present invention and the comparative graphite sheet (C2) as an anode material 10 were respectively pressed together with the separator 12 of polypropylene having a microporous construction and the cathode material 11 in the same way as Example 1 to prepare a lithium secondary cell shown in FIG. 2.

EXAMPLE 4

The graphite film obtained in Example 1 was exposed to air for 24 hours and subjected to a de-doping treatment by distilled water and dried. Then the graphite film (A4) as the anode was used to prepare a lithium secondary cell shown in FIG. 2 in the same way as Example 1.

EXAMPLE 5

Films of polyimide (Capton H film; made by Dupont) having respectively 125 μm, 25 μm, 50 μm, and 75 μm in thickness were treated in the same way as Example 1 except baking at a maximum temperature of 2,800° C. to obtain graphite films (A5) having interphase compounds. The graphite films (A5) after the de-doping treatment were used to prepare a lithium secondary cell shown in FIG. 2 in the same way as Example 1.

EXAMPLE 6

Films of PI, POD, PBT, PBBT, PBO, PBBO, PPA, PBI, PPBI, PT and PPV having 50 μm in thickness were treated, heated and baked in the same way as Example 1 except a maximum temperature of 3,000° C. and K interphase insertion was made by means of the Two-buid method to obtain graphite films having interphase compounds respectively. The graphite films (A6) were subjected to de-doping treatment and were used to prepare a secondary battery shown in FIG. 2. If formation of interphase compounds was carried out under a condition that the K side temperature was set to 250° C. while the graphite side temperature was set to 300° C., first stage interphase compounds were obtained.

EXPERIMENT OF BATTERY PERFORMANCE

Each of the secondary batteries wherein A-1, A-2, A-3, A-4, A-5, C-1 and C-2 graphite films were used as the anode is tested regarding the characteristics of charge-discharge, comparing to the comparative battery (C3) prepared in the same way as Example 1 except use of the anode material as shown in FIG. 1 which is made by baking at 450° C. a laminate sheet having 50 μm in thickness which comprises a copper film 1 having 300 μm in thickness, a first mixture layer 2 of natural graphite powder 40 wt. % in SBR 60 wt. % matrix and a second mixture layer 3 of natural graphite powder 60 wt. % in SBR 40 wt. % matrix.

A-1, A-2, A-3, A-4 and A-5 graphite films respectively have a lot of dopant interphase insertion portions, so that the inventive batteries made of A-1, A-2, A-3, A-4 and A-5 graphite films showed a practical performance which is better than that of C-3 graphite sheet battery with respect to the characteristics of battery charge-discharge, but C-1 and C-2 graphite film batteries showed poorer results than C-3 graphite sheet battery.

A-1, A-2, A-3, A-4 and A-5 graphite films respectively have good electric conductive bodies in which graphite crystalline orientation is arranged along the surface, so that the inventive batteries made of A-1, A-2, A-3, A-4 and A-5 graphite films need no copper foil to support the graphite mixture and acts as a collector, which is much different from C-3 graphite sheet battery.

What is claimed is:

1. A graphite sheet material suitable to a dopant interphase intercalation, which comprises:
   a) an electric conductive body having a surface for contacting an electrolyte, in which graphite crystals are oriented along the surface of the graphite sheet, and wherein said electric conductive body is a graphitized sheet made by baking, at a temperature of more than 2000° C. in an inert gas atmosphere, polymer film 5 to 200 microns in thickness made of a polymer selected from the group consisting of polyoxadiazole (POD), polybenzothiazole (PBT), polybenzo-bis-oxazole (PBBT), polyoxazole (PBO), polybenzo-bis-oxazole (PBBO), polyimide (PI), polyamide (PA), polyphenylene-benzoimidazole (PBI), polyphenylene-benzo-bisimidazole (PPBI), polythiazole (PT) and polyparaphenylene-vinylene (PPV), and
   b) interphase insertion portions in a form selected from the group consisting of through hole, groove, recess and projection formed on the surface of said electric conductive body uniformly distributed over the surface of the graphite sheet, in which graphite phases are built up perpendicularly to the surface to permit dopants to be intercalated laterally into a gap between graphite phases.

2. The graphite sheet material according to claim 1, wherein the polymer film is baked at a temperature of preferably at about 3000° C. in an inert gas atmosphere under a pressure of 0.1 to 50 kg/cm².

3. The graphite sheet material according to claim 1, wherein said polymer film contains 0.5 to 20% of filler based on the weight of the film.

4. The graphite sheet material according to claim 1, wherein said filler is selected from the group consisting of titanium oxide and calcium hydrogenphosphate.

5. The graphite sheet material according to claim 1, wherein the diameter of said through hole or recess, the width of the groove and the radial distance between the adjacent projections is within 0.2 to 100 microns.

6. The graphite sheet material according to claim 1, wherein said through holes, grooves or recesses of the electric conductive body are formed by forming them on the polymer film by means of laser irradiation and baking the polymer film.

7. The graphite sheet material according to claim 1, wherein said projections of the electric conductive body are formed by positioning catalyst material points on which graphite crystals grow up over the surface of the polymer film, stacking them and baking them at a temperature of more than 2000° C.

8. The graphite sheet material according to claim 1, wherein the dopants are donors selected from the group consisting of Li, K, Rb, Cs, Sr and Ba.

9. The graphite sheet material according to claim 1, wherein the dopants are donors selected from the group consisting of metal chloride, metal fluoride, Li, K, Rb, Cs, Sr and Ba.

10. A graphite sheet anode material for non-aqueous lithium secondary battery, which comprises:
   a) an electric conductive body having a surface for contacting an electrolyte, in which graphite crystals are oriented along the surface of the graphite sheet and
   b) interphase insertion portions in a form selected from the group consisting of through hole, groove, recess and projection formed on the surface of said electric conductive body uniformly distributed over the surface of the graphite sheet, in which graphite phases are built perpendicularly to the surface and lithium is intercalated laterally into a gap between graphite phases,
   wherein said electric conductive body is a graphitized sheet made by baking, at a temperature of more than 2000° C. in an inert gas atmosphere, polymer film selected from the group consisting of polyoxadiazole (POD), polybenzothiazole (PBT), polybenzo-bis-oxazole (PBBT), polyoxazole (PBO), polybenzo-bis-oxazole (PBBO), polyimide (PI), polyamide (PA), polyphenylene-benzoimidazole (PBI), polyphenylene-benzo-bisimidazole (PPBI), polythiazole (PT) and polyparaphenylene-vinylene (PPV) and
   said polymer film has a thickness of 5 to 200 microns and contains 0.5 to 20% of filler selected from the group consisting of titanium oxide and calcium hydrogenphosphate based on the weight of the film.

11. The graphite sheet anode material according to claim 10, wherein the polymer film is baked at a temperature of about 3000° C. in an inert gas atmosphere under a pressure of 0.1 to 50 kg/cm$^2$.

12. The graphite sheet anode material according to claim 10, wherein the diameter of said through hole or recess, the wideness of the groove and the radially distance between the adjacent projections is larger than that of lithium ion and within 0.2 to 100 micron, preferably 0.2 to 50 micron.

13. The graphite sheet material according to claim 3, wherein the amount of filler is 1 to 10%.

14. The graphite sheet material according to claim 4, wherein the filler is used with a phosphate.

15. The graphite sheet material according to claim 5, wherein the diameter, width and radial distance are within 0.2 to 50 microns.

16. The graphite sheet anode material according to claim 10, wherein the amount of filler is 1 to 10%.

17. The graphite sheet anode material according to claim 10, wherein the filler is used with a phosphate.

18. The graphite sheet anode material according to claim 13, wherein the diameter, width and radial distance are larger than that of lithium and within 0.2 to 50 microns.

* * * * *